(12) United States Patent
Adibhatla et al.

(10) Patent No.: US 6,532,412 B2
(45) Date of Patent: Mar. 11, 2003

(54) APPARATUS FOR MONITORING GAS TURBINE ENGINE OPERATION

(75) Inventors: Sridhar Adibhatla, West Chester, OH (US); Malcolm John Ashby, Hamilton, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 10/224,797

(22) Filed: Aug. 20, 2002

(65) Prior Publication Data

US 2002/0193933 A1 Dec. 19, 2002

Related U.S. Application Data

(62) Division of application No. 09/705,131, filed on Nov. 2, 2000, now Pat. No. 6,466,858.

(51) Int. Cl.[7] ................................................. G06F 7/00
(52) U.S. Cl. ....................................................... 701/100
(58) Field of Search .......................... 701/100; 415/27, 415/28; 60/772, 773, 39.34

(56) References Cited

U.S. PATENT DOCUMENTS

| 5,080,496 A | * | 1/1992 | Keim et al. |
| 5,489,829 A | * | 2/1996 | Umida |
| 5,689,066 A | * | 11/1997 | Stevenson |
| 5,726,891 A | * | 3/1998 | Sisson et al. |
| 6,226,974 B1 | * | 5/2001 | Andrew et al. ............ 60/39.02 |

* cited by examiner

Primary Examiner—Richard M. Camby
(74) Attorney, Agent, or Firm—David L. Narciso; Armstrong Teasdale

(57) ABSTRACT

A model-based trending process for a gas turbine engine that generates, in real-time, engine trend parameters from engine sensor data and ambient flight condition data to assess engine condition is described. The engine includes a plurality of sensors that are responsive to engine operations. The trending process is implemented using a commercially available processor coupled to the engine to monitor the engine operations, and having the desired processing speed and capacity. Engine health parameters are estimated and adjusted in a model for component diagnostics and fault detection and isolation. The trend parameters generated are retained.

11 Claims, 2 Drawing Sheets

APPARATUS FOR MONITORING GAS TURBINE ENGINE OPERATION

This application is a divisional of U.S. application Ser. No. 09/705,131, filed Nov. 2, 2000 now U.S. Pat. No. 6,466,858 which is hereby incorporated by reference.

This invention herein described was made in the course of or under a contract, or a subcontract thereunder, with the United States Government.

BACKGROUND OF THE INVENTION

This application relates generally to gas turbine engines and, more particularly, to methods and apparatus for trending gas turbine engine operation.

As gas turbine engines operate, the engines may become less efficient due to a combination of factors including wear and damage. Because the rate at which engines deteriorate depends on several operational factors, the rate is difficult to predict, and as such, engine components are typically scheduled for maintenance based on a pre-selected number of hours or cycles. The pre-selected number is typically conservatively selected based on a number of factors including past component experience and past engine health estimates. If a component fails, a predetermined diagnosis routine is followed to identify and replace the failed component.

To estimate engine health and to find engine sensor faults, selected engine parameters are sensed and monitored to estimate an overall loss in engine performance. Typically, rotor speeds, exhaust gas temperatures, and fuel flows are corrected or normalized for variations in operating conditions, and these normalized parameters are trended, i.e., their changes over short and long periods of time are plotted, and used to forecast when engine refurbishment is required. Additionally, immediate engine repairs may be scheduled if comparing current trending values to prior trending values illustrates abrupt changes, or step changes.

Due to manufacturing tolerances, faults, damage, or deterioration with time, actual engine characteristics typically are different from the assumed nominal characteristics. Hence, the traditional normalized parameters may not be accurate. To facilitate improving the estimates of normalized sensor parameters as well as of other trended parameters, engine models and parameter estimation algorithms are used to track engine health and provide "health estimates" of engine components. Known trending estimation algorithms account for variations in operating conditions, but do not account for engine quality and engine deterioration effects. More specifically, because of the complexity of the computations, known correction factors and parameter estimation algorithms do not provide reliable estimations and trend parameters during real-time engine operation.

BRIEF SUMMARY OF THE INVENTION

In an exemplary embodiment, a model-based trending process for a gas turbine engine generates, in real-time, engine trend parameters from engine sensor data and ambient flight condition data to assess engine condition. The engine includes a plurality of sensors that are responsive to engine operations. In an exemplary embodiment, the trending process is implemented using a commercially available processor coupled to the engine to monitor the engine operations, and having the desired processing speed and capacity.

The trending process estimates engine health parameters for use in a model for component diagnostics and fault detection and isolation. The interactions and physical relationships of trend parameters within the engine cycle are retained to permit substantially all sensed and model-generated virtual parameters for trending to be generated simultaneously. As a result, the trending process accounts for engine quality and deterioration effects and provides engine health estimates that facilitate improving estimates of performance parameters or "virtual sensors" for use in trending engine operation.

DETAILED DESCRIPTION OF THE INVENTION

Figure 1:
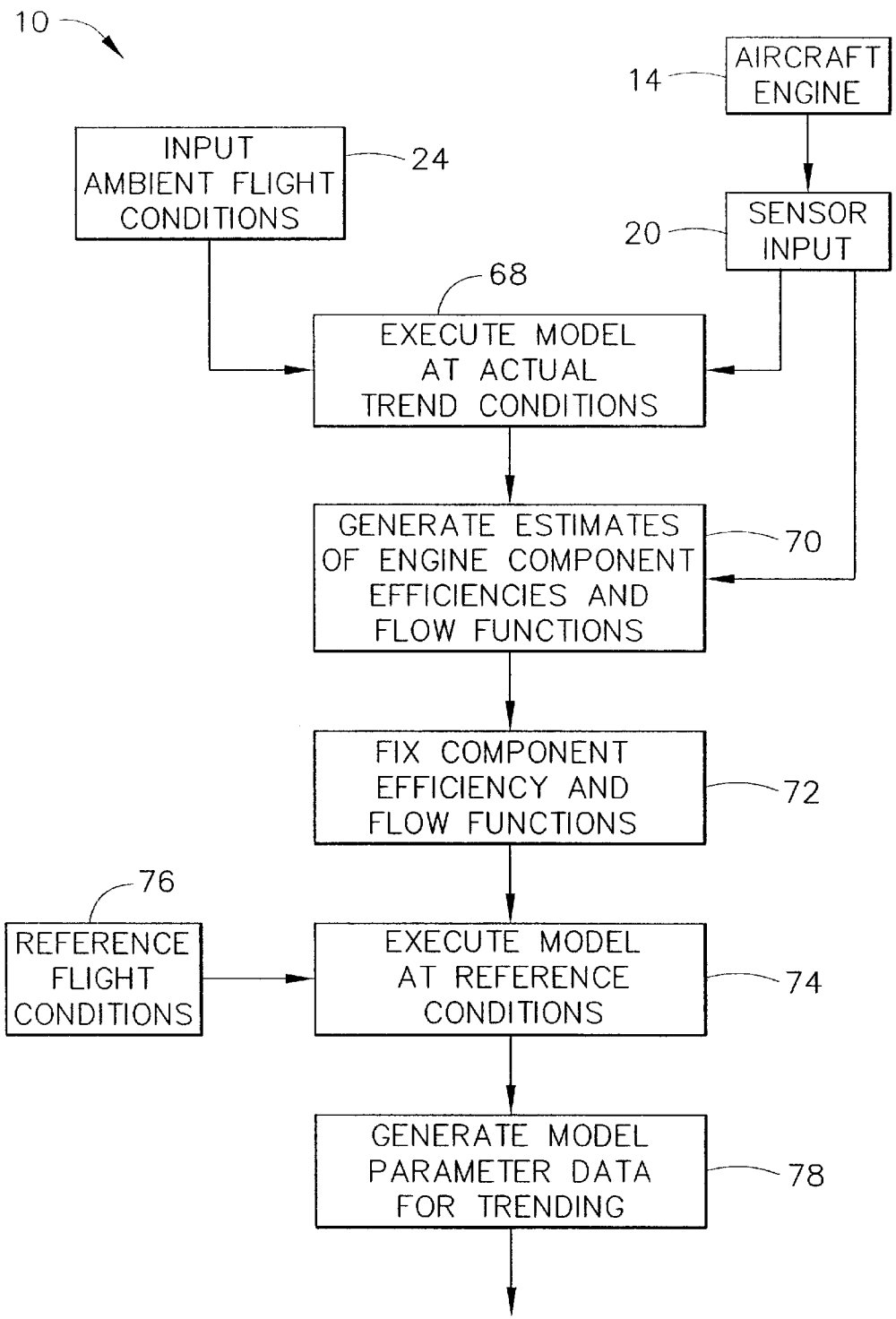
FIG. 1 is a flow chart illustrating an exemplary embodiment of a model-based normalization process.
Figure 2:
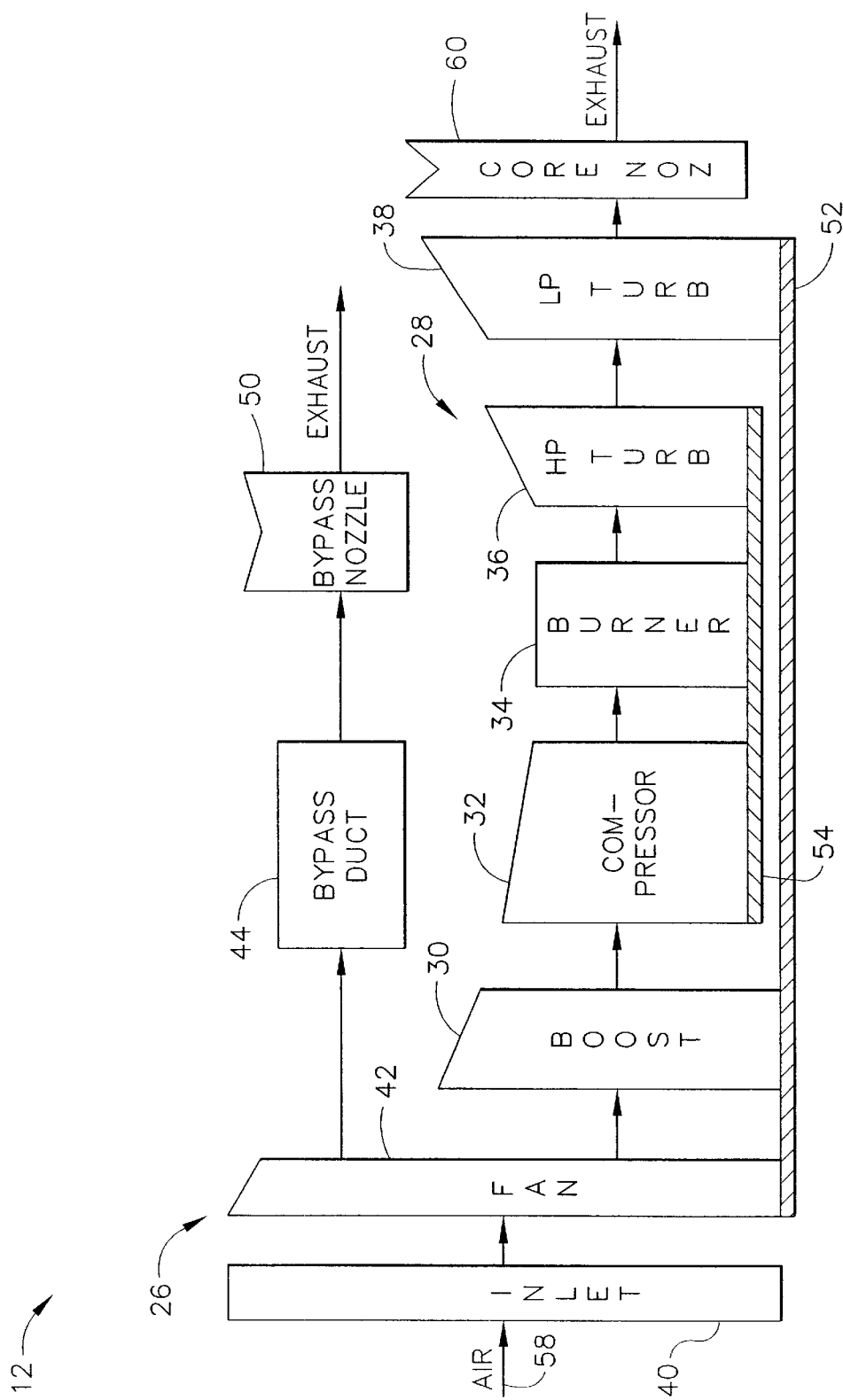
FIG. 2 is a schematic diagram of an engine model that may be used to estimate sensed parameters with the model-based normalization process illustrated in FIG. 1.

FIG. 1 is a flow chart illustrating an exemplary embodiment of a model-based normalization process 10. FIG. 2 is a schematic diagram of an engine model 12 that may be used to estimate sensed parameters with a model-based normalization process, such as process 10 shown in FIG. 1.

Although the present invention is sometimes described herein in the context of trending the health of an actual aircraft engine 14, it should be understood that the invention may be used in many other contexts in which it is desirable to trend the status of actual (i.e. plant) components, as compared to modeling based on a nominal component. In one embodiment, engine 14 is a commercial engine such as a CFM56, CF6, or GE90 engine commercially available from General Electric Company, Cincinnati, Ohio. In another embodiment, engine 14 is an industrial aeroderivative engine such as the LM6000 engine commercially available from General Electric Company, Cincinnati, Ohio. In yet another embodiment, engine 14 is a military engine such as the F110 or F414 engine commercially available from General Electric Company, Cincinnati, Ohio.

A flow chart of a process 10 for generating model parameters for trending is shown in FIG. 1. System 10 could be implemented using, for example, a commercially available processor (not shown) having the desired processing speed and capacity. System 10 includes a memory coupled to the processor, and is coupled to engine 14 to monitor engine operations.

Engine 14 includes a plurality of sensors (not shown) which monitor engine operation and input 20 real-time actual engine sensor data during engine operation to engine model 12. In one embodiment, the sensors monitor engine rotor speeds, engine temperatures, and engine pressures. Ambient flight condition data is also input 24 to engine model 12. In one embodiment, ambient flight condition data input 24 includes, but is not limited to, ambient temperature, ambient pressure, aircraft mach number, and engine power setting parameters such as fan speed or engine pressure ratio. Collecting ambient flight condition data and actual engine sensor data is known in the art.

Engine model 12 is used to estimate sensed parameters, such as rotor speeds, temperatures, and pressures, as well as computed parameters such as thrust, airflows, stall margins, and turbine inlet temperature, based on environmental conditions, power setting parameters, and actuator positions input into engine model 12. In the exemplary embodiment, engine model 12 is a physics-based aero-thermodynamic model 26. In another embodiment, engine model 12 is a regression-fit model. In a further embodiment, engine model 12 is a neural-net model.

Physics-based engine model 26 includes a core engine 28 including in serial, axial flow relationship, a low pressure compressor or booster compressor 30, a high pressure compressor 32, a combustor or burner 34, a high pressure turbine 36 and a low pressure turbine 38. Core engine 28 is downstream from an inlet 40 and a fan 42. Fan 42 is in serial, axial flow relationship with core engine 28 and a bypass duct 44 and a bypass nozzle 50. Fan 42, compressor 30, and low pressure turbine 38 are coupled by a first shaft 52, and compressor 32 and turbine 36 are coupled with a second shaft 54. A portion of airflow 58 entering inlet 40 is channeled through bypass duct 44 and is exhausted through bypass nozzle 50, and remaining airflow 58 passes through core engine 28 and is exhausted through a core engine nozzle 60.

Engine model 12 is known as a Component Level Model, CLM, because each component, 28, 44, 50, 42, 60, and 40 within engine model 12 is individually modeled and then assembled into a specific engine model, such as physics-based engine model 26. Engine model 12 is programmed to represent a fast-running transient engine cycle that accounts for flight conditions, control variable inputs, and high-pressure compressor bleed. Further, engine model 12 includes tunable parameters such as engine component efficiencies and flows. These parameters can be modified using a parameter estimation algorithm, thereby modifying the model of a nominal or average engine to the model of a specific engine.

After receiving ambient flight condition data and actual engine sensor data input 24 and 20, respectively, model-based trending process 10 executes 68 engine model 12 at actual trend conditions using energy and mass balance calculations and a steady-state trim process. The parameter estimation (or tracking) algorithm uses actual sensor data input 20 from the engine sensors and model-computed sensor data input after nominal engine model 12 is executed 68 to estimate 70 engine component efficiencies and flow functions.

The parameter estimation algorithm provides component health parameter estimates in real-time, i.e., on-board engine 14 and during operation. The parameter estimation algorithm is known in the art and may include, but is not limited to a linear regressor or a Kalman filter. Model-based trending process 10 then adjusts or fixes 72 component efficiencies and flow functions in engine model 12 to represent the actual engine component health. The component efficiencies and flow functions relate to gas turbine engine major rotating assemblies including fans, compressors, and turbines.

Re-executing 74 engine model 12 using reference trend conditions, e.g. takeoff operating condition, input 76 to model 12, normalizes data to reference ambient and engine operational conditions and generates 78 model parametric data for use with the trending algorithms.

Because model-based normalization process 10 utilizes model-computed corrected sensor parameters and virtual sensors such as thrust, airflows, stall margins, and turbine inlet temperature, trending parameters are facilitated to be more accurately estimated using process 10 than normalized parameters obtained using known trending estimation techniques that perform simple empirical corrections to sensed parameters. More specifically, model-computed trend alerts such as threshold exceedences, sudden shifts, or slow drifts are facilitated to be more accurate and more representative of actual changes in engine health using process 10 than are obtainable using other known trending estimation algorithms.

While the invention has been described in terms of various specific embodiments, those skilled in the art will recognize that the invention can be practiced with modification within the spirit and scope of the claims.

What is claimed is:

1. Apparatus for trending gas turbine engine operation, the engine having a plurality of sensors responsive to engine operations, said apparatus comprising a processor programmed to:

obtain engine sensor data and ambient flight condition data;

generate and normalize engine trend parameters using the engine sensor data and ambient flight condition data;

adjust engine component efficiencies and flow functions to account for engine faults, engine quality, and engine deterioration effects.

2. Apparatus in accordance with claim 1 wherein to generate and normalize trend parameters, said processor further programmed to use an engine model to generate and normalize trend parameters.

3. Apparatus in accordance with claim 1 wherein said processor further programmed to generate and normalize engine trend parameters in real-time.

4. Apparatus in accordance with claim 1 wherein said processor further programmed to estimate sensed parameters and computed virtual sensor parameters using an engine model.

5. A Apparatus in accordance with claim 1 wherein said processor further programmed to retain the trend parameters generated.

6. Apparatus in accordance with claim 1 wherein said processor further programmed to use at least one of a physics-based, regression-fit, or a neural-net engine model to normalize engine trend parameters.

7. A trending system for trending operation of a gas turbine engine, the engine having a plurality of sensors responsive to engine operations, said system comprising:

an engine model unit coupled to receive engine sensor data and ambient flight condition data input from the sensors; and a processor programmed to generate and normalize engine trend parameters using the engine sensor data and ambient flight condition data obtained, wherein engine component efficiencies and flow functions in said engine model unit are adjusted to account for engine faults, engine quality, and engine deterioration effects.

8. A system in accordance with claim 2 wherein said processor further programmed to generate and normalize engine trend parameters in real-time during engine operation.

9. A system in accordance with claim 3 wherein said engine model is at least one of a physics-based, regression-fit, or a neural-net engine model.

10. A system in accordance with claim 3 wherein said processor further programmed to use a parameter estimation algorithm to adjust engine component efficiencies and flow functions.

11. A system in accordance with claim 10 wherein the parameter estimation algorithm is at least one of a linear regression scheme or a Kalman filter.

* * * * *

UNITED STATES PATENT AND TRADEMARK OFFICE
CERTIFICATE OF CORRECTION

PATENT NO. : 6,532,412 B2
APPLICATION NO. : 10/224797
DATED : March 11, 2003
INVENTOR(S) : Adibhatla et al.

It is certified that error appears in the above-identified patent and that said Letters Patent is hereby corrected as shown below:

Column 4, line 52, delete "2" and insert therefor -- 7 --.

Column 4, line 56, delete "3" and insert therefor -- 8 --.

Column 4, line 59, delete "3" and insert therefor -- 8 --.

Signed and Sealed this

Fifteenth Day of January, 2008

JON W. DUDAS
*Director of the United States Patent and Trademark Office*